UNITED STATES PATENT OFFICE 2,327,899

COMPOSITION FOR PROTECTION AGAINST LIGHT OF SHORT WAVE LENGTH

Samuel Isermann, Summit, and Ernst Ohlsson, Short Hills, N. J.

No Drawing. Application April 14, 1939, Serial No. 267,908

8 Claims. (Cl. 167—90)

This invention relates to improvements in coatings and films for protection against light. It more particularly relates to novel compositions of matter containing substances having the property of absorbing light of short wave length and to substances comprising the active ingredients of those compositions. Compositions of matter which when spread on a surface in the form of a thin film have the property of intercepting and absorbing light of short wave length, whether sunlight or artificially induced light, such as is produced by certain classes of therapeutic lamps, have numerous practical applications of considerable importance. Among these are ultra-violet filters for various photo-chemical and industrial purposes and particularly filtrations of skin burning short wave light which comes in contact with the surface of the body.

It is well known that over-exposure of the body to direct radiation from the sun is apt to cause acute and chronic dermatitis, blisters, severe burns, as well as such disagreeable minor effects as mottling of the skin, pigment anomalies, freckles, etc. The development of a pleasing tan coloration of the skin is much sought after but can be obtained only by allowing the skin gradually to develop its own protective pigmentation by even deposits of melanin. The best way to accomplish this result is by reducing the high intensity of the ultra-violet in the solar radiation.

It has been found that many substances which have heretofore been proposed, such as benzyl cinnamate, benzyl salicylate, menthyl salicylate, aesculetine, salts of quinine, and umbelliferon, although on theoretical grounds capable of a substantial amount of ultra-violet absorption, are practically valueless when used in a thin film, since in order to be effective in any substantial degree it is necessary to use these compounds in high concentrations such as 10%. However, in concentrations of this magnitude considerable expense is involved and when used in contact with the body serious physiological disturbances are highly probable. It thus can be seen that the use of the compounds in effective concentrations is entirely impractical.

Solutions of para amino benzoic acid and its alkali metal salts have also been proposed for this use but it has been found that these compounds are quite unstable, as solutions of them discolor very quickly with the formation of brown precipitates, particularly when exposed to light. Only the most illusory protection against ultra-violet rays can be provided by such compounds in view of their short period of existence when exposed to light. More recently the ethyl ester of para amino benzoic acid has been proposed and used as an ultra-violet filter in protective cosmetics. Other esters of this series, such as propyl and isobutyl have also been suggested for this use. These compounds, however, while somewhat more effective than the above mentioned compounds have numerous properties which render their practical application so difficult as to detract seriously from the usefulness of the compounds themselves. For example, the ethyl ester, as well as the other members of the series, is quite insoluble in water or water alcohol solution. The compounds when used in sunburn protective compositions furthermore have a very high anaesthetic effect upon the terminal nerve endings of the skin, particularly when applied to the lips and are also readily absorbed by the mucous membranes with a lessening of sensation. Moreover it is exceedingly difficult to apply these compounds in a thin film, as at ordinary temperatures they are crystalline in form and thus on evaporation of the carrying solvent are deposited as crystals rather than in the form of a film.

The properties desired in an ultra-violet light filter which is particularly designed to be applied to the skin of a human being are somewhat specialized so that every compound which has the property of absorbing ultra-violet light can not be incorporated into a composition for this purpose, as can be seen from the disadvantages of the various compounds set out above. Compounds to be usable for this purpose must have a relatively high absorption characteristic so that they may be applied in small concentrations. They must moreover be substantially non-staining and non-toxic when applied to the skin and must have the property of forming a continuous film on the skin rather than recrystallizing as the solvent vehicle evaporates. It is further desirable that these compounds shall be soluble in non-oily solvents, as considerable objection has heretofore arisen to compounds proposed for this use in that due to their insolubility in water or alcohol solution they can necessarily be dispensed only in oily vehicles which are messy and unpleasant to apply and soil bathing suits and other garments of the user.

Our investigations have shown that certain esters of amino benzoic acid are valuable as ultra-violet light filters and further, since they possess all of the desirable qualities set forth above, are especially adapted for use in protective cosmetics. These esters comprise the esters of amino benzoic acid and certain substituted derivatives thereof with polyhydric alcohols. Among the polyhydric alcohols we include such substances as glycols, polyglycols, glycerols, polyglycerols and sugars. Of the glycols we may use ethylene glycol itself, its substituted derivatives and higher homologs of this series such as propylene, butylene glycols and the like. Of the polyglycols we may use such substances as diethylene and triethylene glycol and their substituted derivatives, such as mono and di acetates, propionates, butylates and the like. Glycerol, diglycerol, triglycerol and substituted derivatives, as mono and di acetates, propionates, butylates and the like, have been found to be effective as well as numerous sugars, examples of which are mannitol and sorbitol. In addition to these compounds we may also use certain hydroxy acids, examples of which are lactic, tartaric and ricinoleic.

We have further found useful various amino benzoic acids substituted in the amino group, such as the methyl, ethyl and benzyl compounds.

Of the amino benzoic acids, we have found the derivatives obtained by using the para compound preferable, as they possess high impedance for light of short wave length. However, both the ortho and meta compounds and their substituted derivatives may be used. These compounds have been found to be highly soluble in dilute alcohol solutions and in concentrations as little as from 3% to 1% or less, to have high activity as ultraviolet filtering agents possessing better filtering properties than known compounds mentioned above. These substances further have practically no anaesthetic properties and make a clear water alcohol solution in various concentrations, the preferred range of solvent being 30% to 60% aqueous alcohol.

The particular advantages of all these compounds as opposed to the compounds of the prior art lies in the fact that at ordinary temperatures and particularly under the present conditions of preparation these compounds are non-crystalline and thus when applied to the body in an aqueous alcohol solution, will form on the evaporation of the carrying solvent, unbroken films having high protective properties. It is, of course, clear that this is a substantial advantage over the compounds heretofore mentioned, such as the ethyl ester of para amino benzoic acid, which crystallizes on evaporation of the solvent and thus provides no continuous protective film.

The present compounds further are particularly stable to sunlight, so that the inherent difficulty of many of the know filters of being reduced under exposure to sunlight is not possessed by them.

These compounds may be prepared in a variety of ways, such as direct esterification of the alcohol and acid with or without the addition of a catalyst. A particularly valuable member of the group above mentioned is the monoglyceryl ester of para amino benzoic acid. In preparation of the monoglyceryl esters of amino benzoic acid we have also found useful a method of alcoholysis, using amino benzoic acid methyl or ethyl esters as a starting material and changing the methyl or ethyl group for glyceryl by means of the use of heat and sodium or potassium alcoholate as a catalyst. The crude substance obtained by this method may be used without further purification in solutions for application to the body. The substance has a pale yellow color and is of syrupy consistency not crystallizable at room temperature.

As examples of the methods used in obtaining our compounds we may mention the following, though it is to be understood that the amounts and procedures set forth therein are in no sense to be taken as limiting:

*Example 1.*—100 gm. of glycerol mixed with 165 gm. of paraamino ethyl benzoate. The mixture is heated by any convenient means to between 80° and 100° C. until complete solution has occurred. At this point 1.1 gm. of metallic sodium is added to the mixture and the heating is continued preferably in an oil bath. When the temperature has reached approximately 135° C. ethyl alcohol begins to distill off. This continues until the temperature in the reaction vessel reaches about 190° C., at which point about 40 gm. of alcohol have distilled over, which is about 90% of the theoretical amount, and the reaction is completed. The residue remaining in the reaction vessel comprises about 200 gm. of a thick syrupy yellowish liquid containing mainly mono glyceryl paraamino benzoate and a small amount of sodium hydroxide, which may conveniently be neutralized by any convenient acid, such as lactic or acetic. No further purification of the product is necessary or desirable since this material may be dissolved in a convenient aqueous alcohol solution in concentrations of the order of 1 to 3% and applied directly as a light protective agent.

The same procedure may be applied to related benzoates, such as the methyl amino benzoate, in which case 158 gm. of the ester are used. A substitution of the poly alcohol used may also be made as the process of this example is equally applicable to ethylene glycol, diethylene glycol, triethylene glycol, di-glycero, triglycerol, sorbitol or mannitol and their various substituted derivatives, all of which starting materials, however, in order to function properly according to this process should be anhydrous.

*Example 2.*—226 gm. of tri-glycerol are treated with a concentrated water or alcohol solution of 2 gm. of sodium hydroxide (or 2.8 gm. of potassium hydroxide) and the mixture is heated in a partial vacuum until no more water distills off, which is customarily at a temperature of about 130° to 135° C. 151 gm. of methyl para amino benzoate are now added and the reaction proceeds as in Example 1, going to completion at a temperature of approximately 190° to 200° C. after distillation of about 28 gm. of methyl alcohol. The yield is approximately 85% to 95% of theoretical and it will be understood that this product may be directly placed in solution for use as in the manner of Example 1. For triglycerol may be substituted a molecular amount of similar poly alcohols, and for the para compound may be substituted the ortho or meta esters.

*Example 3.*—160 gm. of para amino benzoic acid were dissolved in 640 gm. of ethylene glycol to which was added 80 gm. of sulphuric acid 66 Baumé. This mixture was heated on a boiling water bath for 16 to 20 hours and at the conclusion of this treatment was neutralized with concentrated sodium carbonate solution. Sodium sulphate is precipitated by the addition of approximately 1900 gm. of methanol, the mixture is filtered and the methyl alcohol is distilled off of the clear filtrate. When the distillation of methyl alcohol has been completed, the excess ethylene glycol may be removed under vacuum with temperatures up to 135° C. The residue consists mainly of mono ethylene glycol para amino benzoate and possesses properties and appearance similar to that described above for the other compounds.

*Example 4.*—100 gm. of mannitol and 137 gm. of para amino benzoic acid are combined and heated to approximately 200° C. in a distillation vessel over a space of 1 to 3 hours. At the end of this time, when approximately 15 gm. of water have been distilled, reaction is complete and the residue after neutralization with an alkaline carbonate consists mainly of mannitol di-ester of para amino benzoic acid. The process of this example is, of course, applicable to other sugars, and to the ortho and meta benzoic acids.

The above compounds can also be obtained by reduction, using known methods, of the nitro benzoic acid esters of the desired polyhydric alcohol.

We claim:

1. A light intercepting cosmetic composition characterized by its ability to intercept light of short wave length, neutral action toward nerve endings near the surface of the skin of human beings and continuous film formation when deposited upon the surface of the skin, said composition comprising an ester consisting of a polyhydroxy alcohol mono substituted with p-amino benzoic acid.

2. A light intercepting cosmetic composition as claimed in claim 1 in which the poly hydroxy alcohol is a trihydric alcohol.

3. A light intercepting cosmetic composition as claimed in claim 1 in which the poly hydroxy alcohol is a glycol.

4. A light intercepting cosmetic composition as claimed in claim 1 in which the poly hydroxy alcohol is an ethylene glycol.

5. A light intercepting cosmetic composition as claimed in claim 1 in which the poly hydroxy alcohol is a triethylene glycol.

6. The process which comprises heating together a poly hydric alcohol and an aliphatic ester of amino benzoic acid until solution occurs, adding to the mixture a catalyst chosen from the group consisting of sodium, potassium, sodium hydroxide and potassium hydroxide, and continuing heating with distillation of the aliphatic alcohol corresponding to the ester of the para amino benzoic acid originally used until the distillation is completed.

7. A light intercepting cosmetic composition characterized by ability to intercept light of short wave length, neutral action toward nerve endings of the skin of human beings, and continuous film formation when deposited on the surface of the skin, said composition comprising glyceryl mono p-amino benzoate.

8. A light intercepting cosmetic composition characterized by ability to intercept light of short wave length, neutral action toward nerve endings of the skin of human beings, and continuous film formation when deposited on the surface of the skin, said composition comprising glycol mono p-amino benzoate.

SAMUEL ISERMANN.
ERNST OHLSSON.